United States Patent

[11] 3,596,209

| [72] | Inventor | Dennis J. Picard<br>Maynard, Mass. |
|---|---|---|
| [21] | Appl No | 846,760 |
| [22] | Filed | Aug. 1, 1969 |
| [45] | Patented | July 27, 1971 |
| [73] | Assignee | Raytheon Company<br>Lexington, Mass. |

[54] SIDELOBE SUPPRESSION BY PHASE CANCELLATION IN TRAVELING WAVE DEVICES
6 Claims, 6 Drawing Figs.

[52] U.S. Cl. .................................................. 332/18,
    315/3.5, 331/6, 332/25, 332/58
[51] Int. Cl. ....................................................... H03c 3/34
[50] Field of Search............................................ 332/13, 25,
    58, 18, 19, 71; 331/6; 315/3.5, 3.6

[56] References Cited
UNITED STATES PATENTS

| 3,072,864 | 1/1963 | Alexis et al. ................ | 332/25 X |
| 3,114,886 | 12/1963 | De Santis et al. ............. | 332/13 |
| 3,412,335 | 11/1968 | Risely.......................... | 331/6 X |
| 3,491,312 | 1/1970 | Wilson ........................ | 331/6 X |

Primary Examiner—Alfred L. Brody
Attorneys—Harold A. Murphy, Joseph D. Pannone and Edgar O. Rost ABSTRACT: A circuit arrangement is disclosed for substantial reduction of spurious sideband noise levels in radio frequency signals by coupling a fraction of the power supply voltage ripple directly to a modulating or control electrode of an electron beam interaction type device for the generation or amplification of radiofrequency electromagnetic energy signals. The introduction of the modulating ripple voltage variations on the applicable electrode has a significant effect on cancellation of the original spurious phase modulation of the radiofrequency signals. Such phase modulation, particularly in traveling wave type devices, is believed to result in the generation of the undesired noise signals, particularly at the sideband level, by reason of voltage fluctuations in the power supply for the cathode and helix electrodes.

INVENTOR
DENNIS J. PICARD
BY
ATTORNEY

SIDELOBE SUPPRESSION BY PHASE CANCELLATION IN TRAVELING WAVE DEVICES

BACKGROUND OF THE INVENTION

In radar systems employing the so-called doppler effect, the changes in frequency of the electromagnetic energy signals of a moving target source relative to the observer at a fixed or a movable location is utilized to obtain pertinent information. Transmitters of the type employing amplifiers such as traveling wave tubes to generate high power voltage pulse signals are presently limited by the noise levels, particularly of the sideband frequencies. Noisy sideband lobes produce target echoes substantially similar to those resembling ground clutter echoes to result in confusion in detection of moving targets. Certain systems are also provided with coherent reference signals to detect the doppler frequency shift. In such systems the phase of the transmitted signal is preserved in the receiver as a reference signal for comparison with the target echoes. Analysis of the possible noise sources has indicated that in such traveling wave devices, having for example a helix structure for propagation and interaction with a linear electron beam, voltage modulation variations in the helix-to-cathode power supply can introduce spurious phase modulation of the amplified radiofrequency output signals. In pulse doppler transmitters such phase modulation due to the ripple components of the power supply often times results in frequency signals coinciding with the doppler frequencies of interest. Numerous techniques for the reduction of the ripple voltage problem have, therefore, evolved including filtering which has certain practical limitations rendering additional improvements exceedingly costly. In addition, the power supply transformer generally adds voltage to ground through stray capacitance. No amount of filtering has yet been successful in eliminating this component of the ripple voltage problem and it has been accepted akin to a law of nature which must be tolerated by the system designer.

It is desirable, therefore, particularly in coherent pulse doppler radar systems to maintain the phase relationships as well as to obtain amplified signals having a sideband noise level below 100 db. in 1 kilocycle bandwidth referenced to the signal of interest. In AMTI and MTI radar systems the detection of moving targets will then be greatly improved to enhance their useful range.

SUMMARY OF THE INVENTION

In electron interaction devices such as traveling wave amplifier tubes the synchronism of the electron beam velocity with the velocity of the electromagnetic waves propagating along the helix structure results in the interchange of energy to produce the amplification or generation of radiofrequency signals. The relative phase shift between the radiofrequency input and output of such devices is highly sensitive to the cathode-to-helix voltage potentials. In the design of such devices then, particularly for high power outputs, care must be exercised to prevent power supply voltage variations from modulating the helix-to-cathode voltage which in turn introduces spurious phase modulation of the output signal. Such phase modulation can introduce serious performance degradation in pulse doppler radar and communication systems. As hereinbefore stated, large and rather extensive filters are commonly employed to reduce the effects of power supply ripple on the output signals.

In accordance with the present invention sideband noise is substantially reduced by the realization that the power supply voltage variations can be utilized in such a manner as to effect a phase cancellation or nulling out of the adverse cathode-to-helix voltage variations. In the applicable devices such as a traveling wave tube there commonly exists various control means such as a grid electrode or modulating anode for perturbation of electron beam densities as well as velocities. An appropriate scaled sample of the original power supply ripple voltage existent on the helix electrode is coupled to such a control electrode. Since the phase shift through the beam tube is also sensitive to the cathode-to-control electrode voltages, appropriate scaling and phase shifting of the feedback ripple voltage signals introduces a phase modulation in opposition to that phase modulation produced by the original voltage modulations on the helix electrode. The residual sideband lobes will then be the result only of amplitude modulation initially caused by the helix voltage ripple plus the additional modulation introduced by the control electrode. The two amplitude modulations are in the same direction with the phase modulation now effectively cancelled.

The sideband lobes resulting from phase pushing on both the helix and grid in the traveling wave amplifier tube are considerably larger than those produced by amplitude pushing for the same voltage ripple. The practice of the invention in phase cancellation, therefore, will result in the substantial reduction of the noise signal levels, particularly of the sideband frequencies. The traveling wave amplifier tube is relatively insensitive to amplitude modulation and variations, therefore, in the amplitude results in more current and more output power without upsetting the synchronous relationship of the beam velocity and propagated waves. In such devices the helix structure responds to an increase in voltage by an increase in the beam velocity thereby decreasing the signal delay. The impressing of a ripple voltage modulation on the control electrode, however, raises the electron charge density which is equivalent to an increase in the delay and thereby the initial decrease in signal delay by reason of the helix variations may be effectively offset.

In radar or communication systems not requiring the ultimate in sideband noise level, the disclosed invention will provide for simplification of the power supplies for the electron interaction beam devices. Since large filtering components are presently associated with high voltage power supplies for such devices, the present invention will also provide substantial savings in equipment costs.

While the invention is described herein in conjunction with an embodiment involving traveling wave type tubes, the invention is equally applicable to gated klystrons, twystrons and other linear electron beam tubes. For the purposes of the detailed description the term "control electrode" is intended to include modulating anodes as well as modulating grids for the applicable devices.

BRIEF DESCRIPTION OF THE DRAWINGS

The invention, as well as the details of construction of a preferred embodiment, will be readily understood after consideration of the following detailed description and reference to the accompanying drawings, in which:

and FIGS. 4A, 4B, and 4C are pulse waveform diagrams illustrative of the clamping voltage pulses and pulse train resulting from the application of the illustrative circuit embodiment to a traveling wave tube device.

DESCRIPTION OF THE PREFERRED EMBODIMENT

Figure 1:
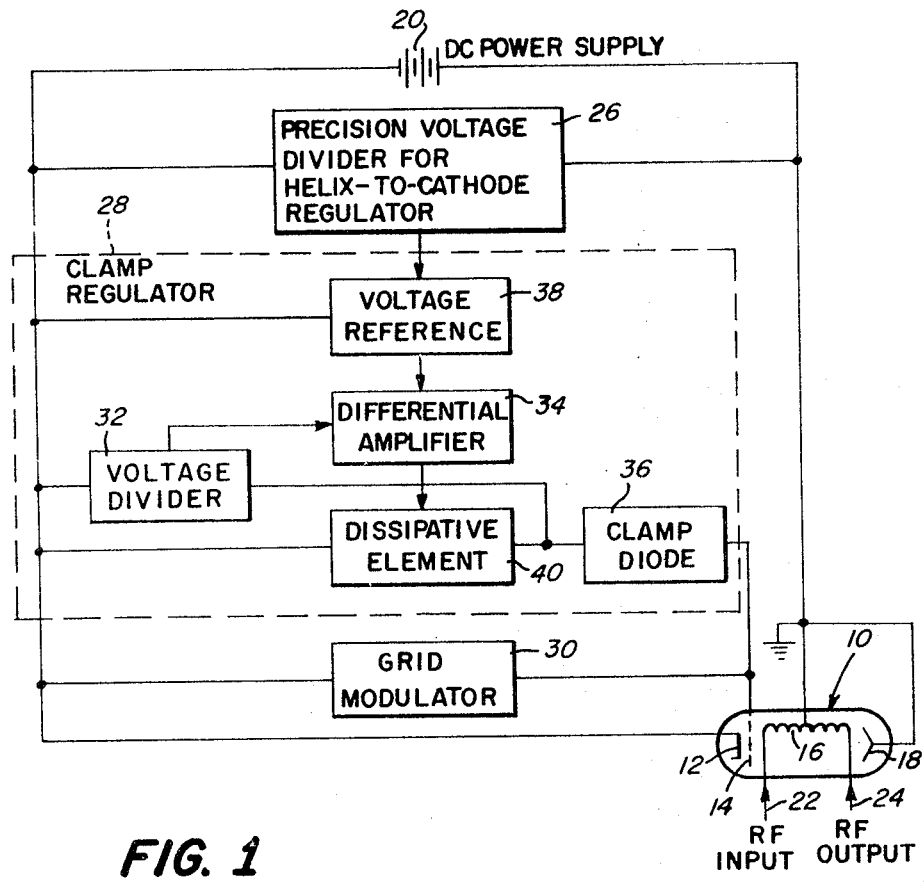
FIG. 1 is a block diagram of an implementation of phase canceller circuit of the present invention.

Referring now to FIG. 1 the implementation of the circuit technique of the present invention for use with a traveling wave type tube is shown. The tube 10 includes the conventional components such as a cathode 12, grid 14, helix 16 and collector 18 within an envelope, all well known within the art. The main DC power supply 20 is coupled between the appropriate electrodes in the conventional manner. In certain applications voltages of approximately 40 KV to 50 KV are applied between the helix and the cathode. The radiofrequency input 22 and radiofrequency output 24 are coupled to the opposing ends of the helix. Radiofrequency signals may be coupled to the traveling wave amplifier tube from, illustratively, a continuous wave oscillator, and a pulse modulator is coupled to the tube to provide the intermittent pulses for, illustratively, a doppler radar system. In connection with a transmitter designed for use with the gridded traveling wave tube disclosed, a precision voltage divider 26 is employed to regulate the helix-to-cathode voltages. This voltage divider will provide a signal voltage which is proportional to the helix-to-cathode voltage variations. Such a signal voltage is used to modulate the voltage reference for the grid modulator clamp or shunt regulator 28, thereby providing a modulation of the clamp voltage so that the amplitude of the grid modulator pulses will follow the amplitude of the helix-to-cathode voltage perturbations to effectively cancel the phase ripple caused by the voltage supply variations.

The clamp regulator 28 serves to maintain a constant pulse voltage level applied to the control electrode 14. The additional feature of the phase cancellation in accordance with the teachings of the present invention are readily adaptable to such a regulator with the source of signals emanating from a section of the precision voltage divider 26. The clamp regulator includes another divider 32 serially connected to the precision voltage divider as well as differential amplifier 34 and clamp diode 36. An output signal from the voltage divider 26 is fed to a voltage reference 38 which also provides a second input for the differential amplifier 34. The remaining component in the clamp regulator 28 comprises a dissipative element 40 coupled to the output of the differential amplifier 34 and serially connected through a clamp diode 36 to the grid electrode 14 with the grid modulator in shunt. With a 40 KV to 50 KV on the cathode-to-helix it is possible to obtain effective phase cancellation with the circuit of the invention having a power requirement of only 100 millivolts.

Figure 2:
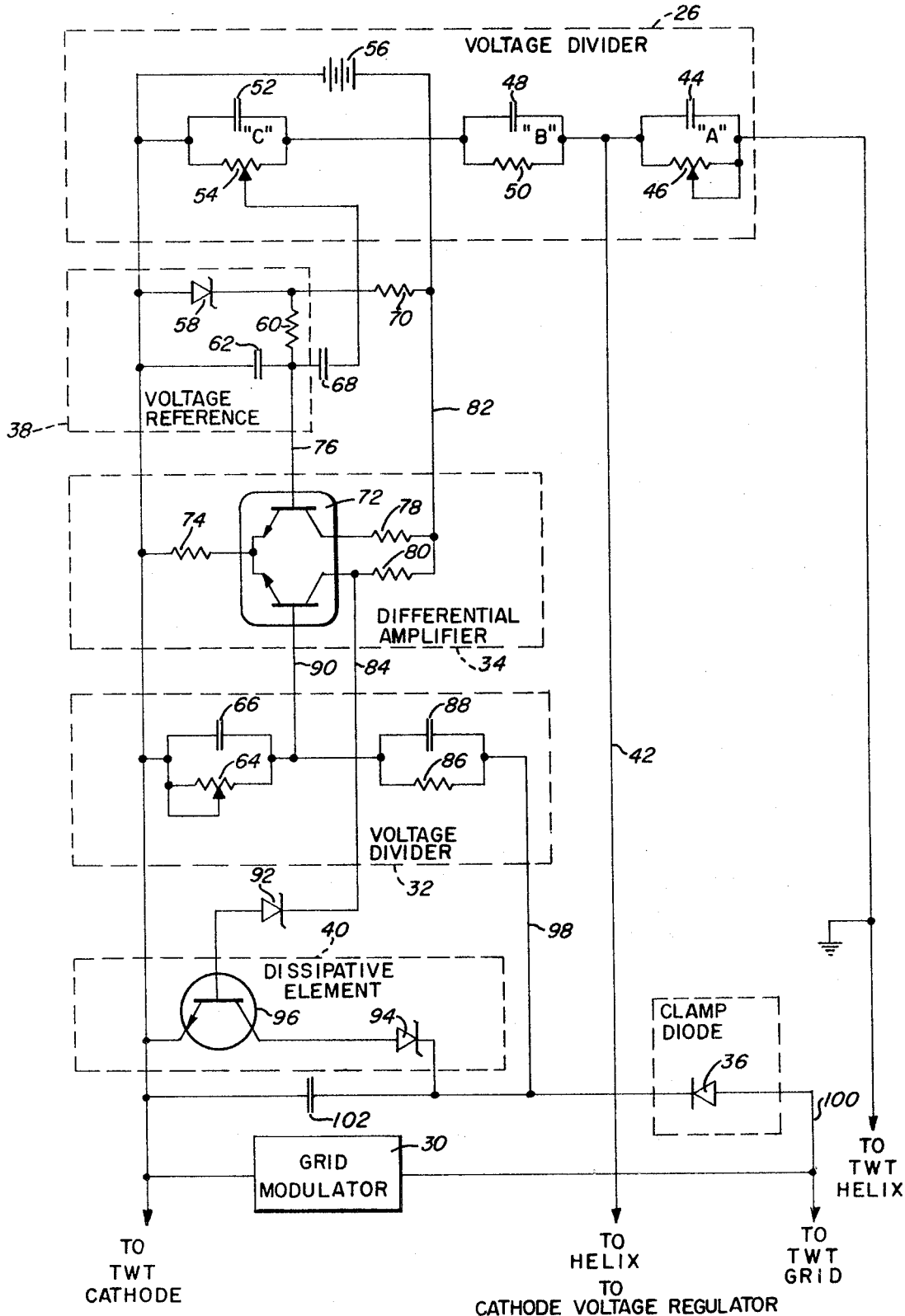
FIG. 2 is a schematic diagram of the illustrative circuit embodiment of the invention.

A detailed description of an illustrative simplified schematic circuit embodying the principles of the invention will now be described with reference to FIG. 2. The precision voltage divider 26 for the helix-to-cathode regulator comprises 3 sections designated A, B and C. Sections A and B make up a 6,400:1 voltage divider for the helix-to-cathode voltage regulator. Sections B and C have been added for the phase cancellation in accordance with the teachings of the invention and comprise a 2,000:1 voltage divider. There is in effect a double-ended voltage divider since the helix-to-cathode voltage must be sensed at ground or helix level for use by the voltage regulator and also sensed at the tube cathode level for use in the phase cancellation circuit. Lead 42 provides for the connection of sections A and B to the helix-to-cathode voltage regulator. Substantially identical components comprise each of the sections with sections A and C having resistors with variable taps. Section A comprises a capacitive element 44 such as a condenser, as well as resistor 46. Section B comprises condenser 48 and resistor 50, while section C includes condenser 52 and resistor 54. The voltage divider consisting of sections B and C is connected across a power supply 56 of relatively low voltage, for example 10 volts, for activation of the phase canceller voltage pulse circuit which requires very little power.

The next component in the phase canceller circuit is the voltage reference 38. This component includes a diode 58 biased in the appropriate manner and may comprise a Zener diode. A resistive capacitive network is coupled through the diode means and includes resistor 60 and condenser 62 which are designed to match similar components, namely resistor 64 and condenser 66 disposed on the other side of the differential amplifier 34 in voltage divider 32 to make up the voltage reference circuit. Condenser 68 and resistor 70 are utilized to couple a portion (determined by the ratio of the values of condenser 68 to condenser 62) of the output from section C of the voltage divider 26 to the reference circuit 38.

The following component comprises a differential amplifier 34 which includes an emitter follower type transistor 72 which may, for example, be a Type 2N2920 transistor. The common emitter electrodes are controlled by resistor 74. One base electrode member is coupled by lead 76 to the voltage reference circuit 38. The collector electrodes are connected through resistors 78 and 80 to the power supply 56 and dissipative element 40 by leads 82 and 84, respectively.

In the illustrative circuit, a second voltage divider 32 includes the matching components resistor 64 and condenser 66 as well as resistor 86 and condenser 88. Lead 90 connects the voltage divider circuit to the other base electrode of the transistor 72. The lead 84 coupled through Zener diode 92 to the dissipative element 40 allows operation of the differential amplifier 34 at the desired DC operating level. Excess energy over a predetermined value required to operate the phase canceller circuit will be dissipated by the dissipative element 40.

The dissipative element 40 includes a Zener diode 94 and transistor 96. The output signal of the differential amplifier 34 differentiated in accordance with the feedback voltage desired to be applied to the traveling wave tube control electrode after being divided by voltage divider 32 is fed by means of lead 98 to the grid modulator 30 through an appropriate clamp diode 36 and lead 100. In view of certain inherent circuit characteristics in the grid modulator 30 as far as response time is concerned a condenser 102 may be incorporated in the circuit to provide a low impedance for fast rise time pulses applied to the control electrode of the traveling wave tube device.

In the foregoing description of the circuit incorporating the phase cancellation feature, singular components in the capacitive coupled resistor divider circuits were shown in an attempt to simplify the explanation. In actual exemplary embodiments it is realized that more elaborate circuitry, including pluralities of many of the components for these and other circuits will be required. Electrical means for driving the various electrodes of the transistors will also require large numbers of components in accordance with the individual detailed circuit requirements and specifications. An embodiment of a grid modulator for modulation of a high power traveling wave tube having a helix-to-cathode voltage of approximately 40 kv. to 50 kv. and a peak output power of 500 kw. had a value of approximately 1,500 volts. The clamp regulator for maintaining the amplitude limits of the waveforms of the pulses at a specified potential may also be referred to in the art as a shunt regulator.

Figure 3:
FIG. 3 is a pictorial representation of the phase ripple waveforms involved in an understanding of the present invention.
Figure 3:
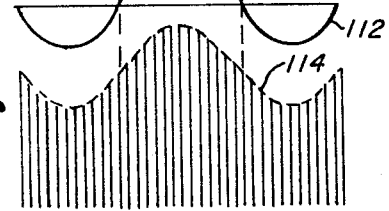
Figure 3:
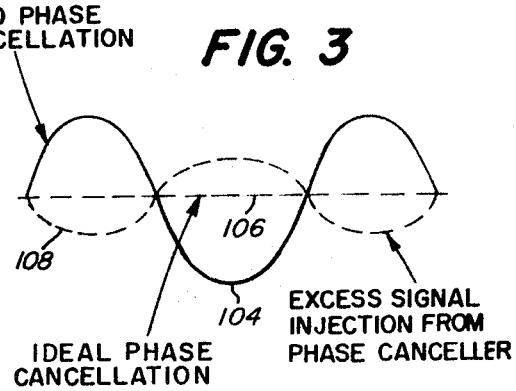

The manner in which the phase cancellation modulation introduced to the control electrode will operate in relation to the reduction of noise as well as the manner in which the pulse trains follow the clamp regulator voltage emanating from the phase canceller circuit will now be described. In FIG. 3 an exemplary phase ripple signal is indicated by sine waveline 104. With substantially complete cancellation of any spurious phase modulation resulting from the cathode-to-helix voltage supply ripple a substantially straight line 106 would result. The opposite effect of the application of a phase canceller circuit to provide the modulation signals to follow the voltage perturbations of the helix-to-cathode voltage is indicated by the dotted line 108 where an excess signal injection is noted. The phase modulation signal from the phase canceller circuit is in the opposite direction to the original helix-to-cathode voltage variations caused by the power supply ripple. In most instances the finalized circuit parameters will lie in a range somewhere between the ideal conditions indicated by line 106 and the sine wave 108.

Referring next to FIG. 4A the waveform of a typical traveling wave tube having cathode-helix voltage ripple is indicated by line 110. In FIG. 4B the induced voltage pulse on the control electrode utilizing the canceller circuit is indicated by line 112. The direction of the phase orientation is now in the opposite direction. The pulse train through the pulse modulator to the traveling wave amplifier tube is now shown in FIG. 4C with dotted line 114 following the amplitude of each pulse now reflecting the influence of the induced reverse phase cancellation signals. The final amplified signals will evidence the improved sideband frequencies at relatively low noise levels which will render the returning target echoes readily discernible in such systems employing the doppler frequency shift.

While a specific illustrative phase canceller circuit has been described herein it will be evident to those skilled in the art that numerous modifications, variations or alterations may be practiced without departing from the spirit and scope of the invention as defined in the appended claims. It is intended, therefore, that the foregoing description be considered as illustrative only and not in a limiting sense.

I claim:

1. A circuit for reduction of sidelobes in output pulse signals of traveling wave devices attributable to voltage supply ripple comprising:
   a DC voltage source;
   a traveling wave device having means for generating and directing an electron beam along a path, an energy propagating structure and a control electrode;
   means for applying an electrical potential from said voltage source between said electron beam generation means and said energy propagating structure;
   means for sensing and detecting the voltage between said electron beam generating means and said propagating structure to provide a voltage modulating signal proportional to the voltage variations introduced by said voltage source ripple;
   and means for applying said voltage modulating signals to said control electrode to vary the density of the electron beam and substantially cancel the effects of the voltage source ripple on said energy propagating structure voltages.

2. A circuit for reduction of sidelobes in output pulse signals of traveling wave devices comprising:
   a DC voltage source;
   A traveling wave device having a cathode for generating an electron beam, a slow wave propagating structure aligned coaxially with said beam and a control electrode;
   means for applying an electrical potential from said voltage source between said cathode and slow wave structure;
   means for sampling the voltage between said cathode and slow wave structure to generate voltage modulating signals reflecting variations resulting from ripple in said voltage source;
   and means for applying said sampled voltage modulating signals to said control electrode to modulate said electron beam.

3. A circuit for reduction of sidelobes in output pulse signals of traveling wave devices comprising:
   a direct current voltage source having inherent voltage ripple;
   a traveling wave device having a cathode for generating an electron beam, a helix electrode aligned coaxially with said beam and a control electrode;
   means for applying a pulsed signal to modulate said control electrode to result in output signals of electromagnetic energy;
   means for applying an electrical potential from said voltage source between said cathode and helix electrodes;
   means for detecting and producing voltage modulating signals proportional to the voltage variations on the helix electrode introduced by said voltage source ripple;
   and means for applying said voltage modulating signals to said control electrode modulator whereby the phase of the pulsed signals closely follows the phase of said voltage ripple to substantially cancel the inherent effects of the voltage source ripple on the helix electrode voltages.

4. A circuit according to claim 3 wherein said signal detecting and producing means include capacitive coupled resistor voltage divider means.

5. A circuit according to claim 3 wherein said signal detecting and producing means include capacitive coupled resistor voltage divider means and said means for applying the voltage variation signals include a pulse clamping circuit in shunt with said control electrode modulator.

6. A circuit according to claim 5 wherein said pulse clamping circuit includes second voltage divider means coupled to a voltage reference through a voltage differential amplifier means, said amplifier means having an output lead coupled through a dissipative element to a clamping diode means, the input from said voltage reference being connected to said first-named voltage divider means.